Oct. 30, 1956    C. MENTZER    2,769,015
PROCESS OF PREPARING 3-METHYL-CHROMONE
Filed Oct. 4, 1955

United States Patent Office 2,769,015
Patented Oct. 30, 1956

2,769,015

PROCESS OF PREPARING 3-METHYL-CHROMONE

Charles Mentzer, Lyon, France, assignor of one-half to Laboratoires Laroche-Navarron, Levallois, France, a French body corporate Application October 4, 1955, Serial No. 538,490

Claims priority, application France October 6, 1954

12 Claims. (Cl. 260—345.2)

Figure 1:
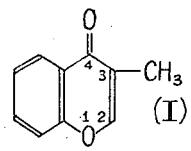

The present invention relates to a process of preparing 3-methyl-chromone. This compound, which has the empirical formula $C_{10}H_8O_2$ and the structural formula shown in Fig. 1 of the accompanying drawing, is a substance used in therapeutics for the treatment of angina pectoris (see Soulie, Chiche, Carlotti and Baillet, Presse Medicale, 1954, 62, 847).

This compound was first obtained by Mentzer and Meunier (Bull. Soc. Chim., 1944, 11 (5), 304) who prepared it by reacting ethyl formate with ortho-hydroxy-propiophenone in the presence of metallic sodium.

Such a process is however difficult to carry out on a commercial scale and this is the reason why it was found desirable to seek a simpler and less dangerous process.

The object of this invention is to provide such a process.

This process comprises condensing ortho-hydroxy-propiophenone with a derivative of oxalic acid having the general formula XCO—COOR, in which X is a halogen and R represents an alkyl radical, and thereafter decarboxylating the product of condensation obtained after saponifying the group R.

Preferably, X represents a chlorine atom and R an ethyl radical.

Figure 2:
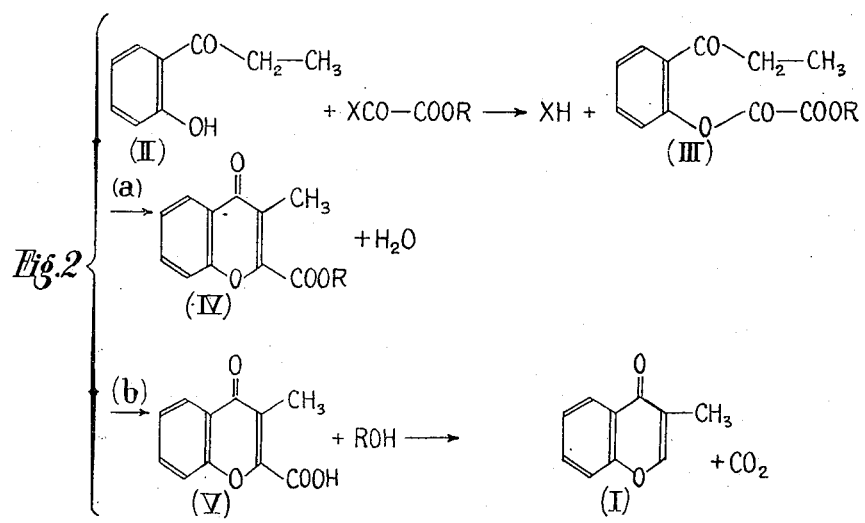

The sequence of reactions which is the basis of the present process is illustrated in Fig. 2, in which the series of reactions (a) relates to the condensation of ortho-hydroxypropiophenone (II) with XCO—COOR, and the series (b) to the decarboxylating of the product of condensation obtained after saponifying.

The condensation is conveniently carried out by simply heating in a basic solvent such as pyridine, diethyl-aniline, triethylamine etc. It is also possible to operate without solvents.

This reaction provides, in observing the aforementioned conditions, the cyclised compounds of the type (IV) with intermediate formation of non-cyclised compounds of the type (III) which may remain in small amounts at the end of the reaction. Their isolation is extremely difficult and not desirable.

The condensation product is then saponified, which converts the compound (IV) into 3-methyl-chromone-2-carboxylic acid (V) which is thereafter decarboxylated. The saponification may be effected by any conventional method. The decarboxylation may be effected by heating the acid (V) in the presence or in the absence of a catalyst. But it is also possible, in this case, to resort to any other physical or chemical means capable of breaking the bond between the carbon atom at position 2 of the benzopyronic cycle and that of the carboxyl group.

The 3-methyl-chromone (I) which results from these various operations is, after purification, in the form of colourless crystals which melt at 68°. Its physical and chemical properties (ultra-violet spectrum with maxima at 305 m$\mu$ and at 295 m$\mu$, boiling point, solubility in concentrated hydrochloric acid, elementary analysis, etc.) are identical to those of an authentic specimen, obtained in accordance with the conventional method (Bull. Soc. Chim., 1944, 11 (5), 304).

The following example, to which the invention is by no means restricted, is given for the purpose of illustrating the process of the invention.

Example (1) Preparation of 3-methyl-chromone-2-ethyl carbonate (Compound IV, $R=C_2H_5$):

20 g. of ortho-hydroxy-propiophenone (0.135 mol), 30 cc. of dry pyridine and 11 g. (0.1 mol) of ethyl oxalate monochloride $ClCOCOOC_2H_5$ are heated for half an hour in a water bath. After cooling the reactional mixture is poured onto an excess of iced diluted hydrochloric acid; the oil which precipitates is extracted with ether and it is dried on potassium carbonate. After evaporation of ether the residue is distilled, whereafter it crystallizes.

$E_{0.4mm.} = 132°$ C.
$F = 90–91°$ C.

*Analysis.*—C, percent found, 67.07; calculated, 67.23. H, percent found, 5.02; calculated, 5.21.

(2) Preparation of 3-methyl-chromone-2-carboxylic acid (Compound V):

160 g. (1 mol) of the foregoing product are dissolved in a minimum of boiling 95% alcohol. 67.2 g. of a hydroalcoholic solution of potash (1.2 mols) are added. The solution is refluxed for an hour and the alcohol is evaporated off in a vacuum. A small quantity of water is added to the residue and the acid is precipitated by concentrated hydrochloric acid. The acid is allowed to crystallize in an ice box, drained and dried in a vacuum.

(3) Preparation of 3-methyl-chromone (Compound I):

3-methyl-chromone-2-carboxylic acid, obtained as described above under (2), is heated at 180° C. in a flask disposed in an oil bath. When the carbon dioxide ceases to be given off, the obtained chromone is rectified in a vacuum.

$E_{15mm.} = 156°$ C.

The distilled product is recrystallized in ethanol.
$F = 68°$ C.

Ultra-violet spectrum: maxima at 305 m$\mu$ and at 295 m$\mu$ (in ether):

$$\epsilon_{1\,cm.}^{1\%} \text{ at } 305m\mu = 530$$

*Analysis.*—C, percent found, 74.95; calculated, 75. H, percent found, 5.03; calculated, 5.

When mixed with the compound prepared in accordance with the conventional method (Bull. Soc. Chim., 1944, 11 (5), 304) the melting point of this compound does not drop.

It will be understood that the process gives substantially identical results if in the first part of the foregoing example the ethyl oxalate monochloride is replaced by the equivalent amount of ethyl oxalate monobromide or mono-iodide. It is also possible to use an equivalent quantity of monochlorides, monobromides or mono-iodides of the methyl-, propyl-, butyl-, pentyl-, hexyl-, heptyl-, octyl-oxalates, etc. The ethyl oxalate monochloride is, however, preferred as it is readily available.

Further, the pyridine used in the first part of the foregoing example may be replaced by any other basic solvent such as diethylaniline, triethylamine etc., or no solvent used at all.

In the third part of the example the decarboxylation of 3-methyl-chromone-2-carboxylic acid, instead of being effected simply by heating, may be actuated by a catalyst. The latter, used in the average amount of 0.1 g. to 1 g. per gram of the compound to be decarboxylated, may be in particular animal black, washed sand or very fine powdered glass, etc.

Having now described my invention what I claim as new and desire to secure by Letters Patent is:

1. Process of preparing 3-methyl-chromone, comprising condensing ortho-hydroxy-propiophenone with a derivative of oxalic acid having the general formula XCO—COOR, in which X is a halogen and R represents an alkyl radical, thereafter saponifying the condensation product thus obtained and thereafter decarboxylating the saponified product.

2. Process of preparing 3-methyl-chromone comprising heating ortho-hydroxy-propiophenone with a derivative of oxalic acid having the general formula

XCO—COOR in which X is a halogen and R represents an alkyl radical, thereafter saponifying the condensation product thus obtained and thereafter decarboxylating the saponified product.

3. Process as claimed in claim 2, wherein the heating of the ortho-hydroxy-propiophenone and of the derivative of the oxalic acid XCO—COOR is effected in a basic solvent medium.

4. Process as claimed in claim 3, wherein said basic solvent is pyridine.

5. Process as claimed in claim 3, wherein said basic solvent is diethylaniline.

6. Process as claimed in claim 3, wherein said basic solvent is triethylamine.

7. Process of preparing 3-methyl-chromone comprising heating ortho-hydroxy-propiophenone with a derivative of oxalic acid having the general formula

XCO—COOR in which X is a halogen and R represents an alkyl radical, thereafter saponifying the condensation product thus obtained and thereafter heating the saponified product so as to decarboxylate it.

8. Process as claimed in claim 7, wherein the heating of the saponified product is effected in the presence of a catalyst.

9. Process of preparing 3-methyl-chromone, comprising condensing ortho-hydroxy-propiophenone with ethyl oxalate monochloride, thereafter saponifying the condensation product thus obtained and thereafter decarboxylating the saponified product.

10. Process as claimed in claim 9, wherein the condensation is effected by heating in a basic solvent medium.

11. Process as claimed in claim 9, wherein the decarboxylation is effected by heating the saponified product.

12. Process as claimed in claim 11, wherein the heating of the saponified product is effected in the presence of a catalyst.

No references cited.